US011986017B2

(12) United States Patent
Liu

(10) Patent No.: US 11,986,017 B2
(45) **Date of Patent: *May 21, 2024**

(54) HIGH-FREQUENCY HEATING DEVICE

(71) Applicant: Shenzhen Eigate Technology Co., Ltd., Shenzhen (CN)

(72) Inventor: Tuanfang Liu, Shenzhen (CN)

(73) Assignee: ASPIRE NORTH AMERICA LLC

( * ) Notice: Subject to any disclaimer, the term of this patent is extended or adjusted under 35 U.S.C. 154(b) by 643 days.

This patent is subject to a terminal disclaimer.

(21) Appl. No.: 17/129,832

(22) Filed: Dec. 21, 2020

(65) Prior Publication Data

US 2021/0401050 A1 Dec. 30, 2021

(30) Foreign Application Priority Data

Jun. 29, 2020 (CN) ......................... 202010605464.0
Jun. 29, 2020 (CN) ......................... 202021227108.1

(51) Int. Cl.

| | |
|---|---|
| ***A24F 13/00*** | (2006.01) |
| ***A24F 1/30*** | (2006.01) |
| ***A24F 40/20*** | (2020.01) |
| ***A24F 40/42*** | (2020.01) |
| ***A24F 40/465*** | (2020.01) |
| ***A24F 40/57*** | (2020.01) |
| ***H05B 6/10*** | (2006.01) |
| ***H05B 6/36*** | (2006.01) |

(52) U.S. Cl.

CPC .............. *A24F 40/465* (2020.01); *A24F 1/30* (2013.01); *A24F 40/20* (2020.01); *A24F 40/42* (2020.01); *A24F 40/57* (2020.01); *H05B 6/105* (2013.01); *H05B 6/362* (2013.01)

(58) Field of Classification Search

CPC ........................................................ A24F 47/00
USPC .................................................. 131/328–329
See application file for complete search history.

(56) References Cited

U.S. PATENT DOCUMENTS

2015/0122275 A1* 5/2015 Wu ....................... A24F 40/485 131/329
2016/0324216 A1* 11/2016 Li ........................... A24F 40/30
2018/0184716 A1* 7/2018 Song ..................... A24F 40/485
2018/0192701 A1* 7/2018 Stoner ............... A61M 15/0025
2019/0387787 A1* 12/2019 Hejazi .................... A24D 1/002
2020/0253283 A1* 8/2020 Vanko ................... A24F 40/465
2021/0360966 A1* 11/2021 Liu ........................... A24F 1/32
2021/0360973 A1* 11/2021 Liu ........................... A24F 1/30
2021/0401049 A1* 12/2021 Liu ......................... A24F 40/20
2022/0061391 A1* 3/2022 Liu ........................ A24F 40/465
2022/0125116 A1* 4/2022 Liu ......................... A24F 40/48
2022/0160039 A1* 5/2022 Liu ........................... A24F 1/30

(Continued)

FOREIGN PATENT DOCUMENTS

CN 209449669 * 10/2019

*Primary Examiner* — Phuong K Dinh

(74) *Attorney, Agent, or Firm* — MATTHIAS SCHOLL P.C.; Matthias Scholl

(57) ABSTRACT

A high-frequency heating device includes a heating cup and a magnetic induction coil; the magnetic induction coil is a flat spiral disc; the heating cup is disposed on the magnetic induction coil; the heating cup includes glass; the heating cup includes a cup base and a cup space for holding tobacco material; and the cup base includes metal enclosed within the glass that forms the cup base and separates the metal from the cup space.

7 Claims, 3 Drawing Sheets

(56) References Cited

U.S. PATENT DOCUMENTS

2022/0175024 A1* 6/2022 Liu ........................ A24F 40/485
2022/0322740 A1* 10/2022 Clemens ................. A24F 40/40

* cited by examiner

HIGH-FREQUENCY HEATING DEVICE

CROSS-REFERENCE TO RELATED APPLICATIONS

Pursuant to 35 U.S.C. § 119 and the Paris Convention Treaty, this application claims foreign priority to Chinese Patent Application No. 202010605464.0 filed on Jun. 29, 2020, and to Chinese Patent Application No. 202021227108.1 filed on Jun. 29, 2020. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a high-frequency heating device.

Conventionally, a high-frequency heating device comprises a magnetic induction coil. The magnetic induction coil is made of copper and is in the shape of a hollow cylindrical spiral.

SUMMARY

The disclosure provides a high-frequency heating device, comprising a heating cup and a magnetic induction coil; the magnetic induction coil is a flat spiral structure.

In a class of this embodiment, the magnetic induction coil is a flat spiral disc; and the heating cup is disposed on the magnetic induction coil.

In a class of this embodiment, the heating cup comprises glass with an inlaid metal.

In a class of this embodiment, the magnetic induction coil is a coiled copper wire coated with an insulating high temperature resistant material.

In a class of this embodiment, the device further comprises an upper cover and a lower cover; the heating cup and the magnetic induction coil are disposed in a space formed by the upper cover and the lower cover.

In a class of this embodiment, the upper cover comprises an opening communicating with the heating cup and a tobacco material is added to the heating cup via the opening.

In a class of this embodiment, the device further comprises a high-frequency control panel and a battery disposed in the space formed by the upper cover and the lower cover; the battery is soldered on an input end of the high-frequency control panel; an output end of the high-frequency control panel is soldered on an input end of the magnetic induction coil to supply alternating voltage and alternating current for the magnetic induction coil whereby an alternating magnetic field is formed in the magnetic induction coil.

The disclosure also provides an electronic cigarette, comprising the high-frequency heating device.

In a class of this embodiment, the electronic cigarette further comprises a smoke filter configured to filter smoke or vapor in water for user's inhaling.

DETAILED DESCRIPTION

To further illustrate, embodiments detailing a high-frequency heating device are described below. It should be noted that the following embodiments are intended to describe and not to limit the disclosure.

Principle of high frequency heating: when an alternating current is introduced to a magnetic induction coil, an alternating magnetic field will be generated. When a metal conductor is placed in the alternating magnetic field, an eddy current is produced. The eddy current makes the metal conductor heated.

Tobacco materials refer to tobacco tar, tobacco paste, tobacco leaf and other materials used to produce smoke.

Figure 1:
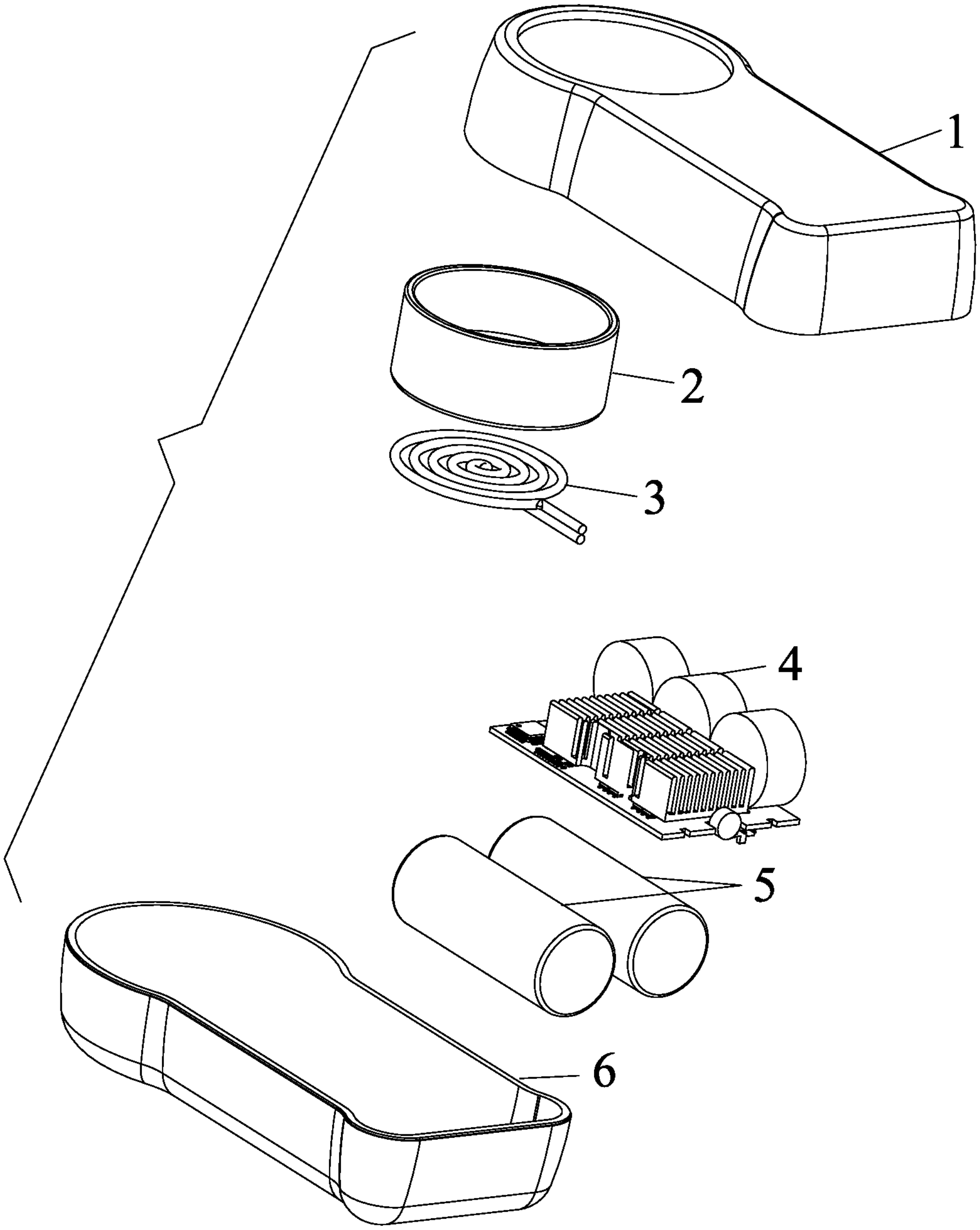
FIG. 1 is an exploded view of a high-frequency heating device in accordance with one embodiment of the disclosure.
Figure 2:
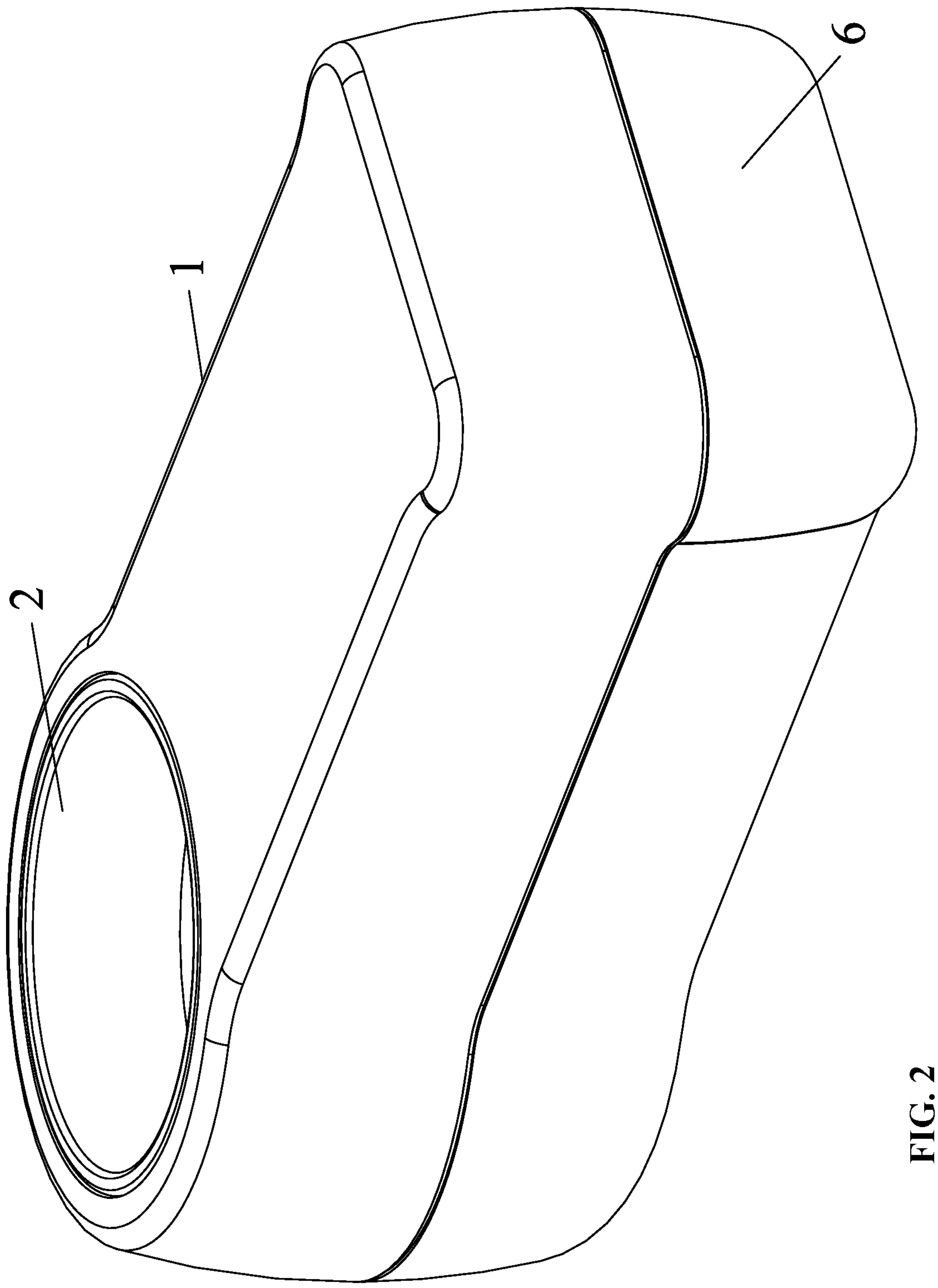
FIG. 2 is a schematic diagram of a high-frequency heating device in accordance with one embodiment of the disclosure.
Figure 3:
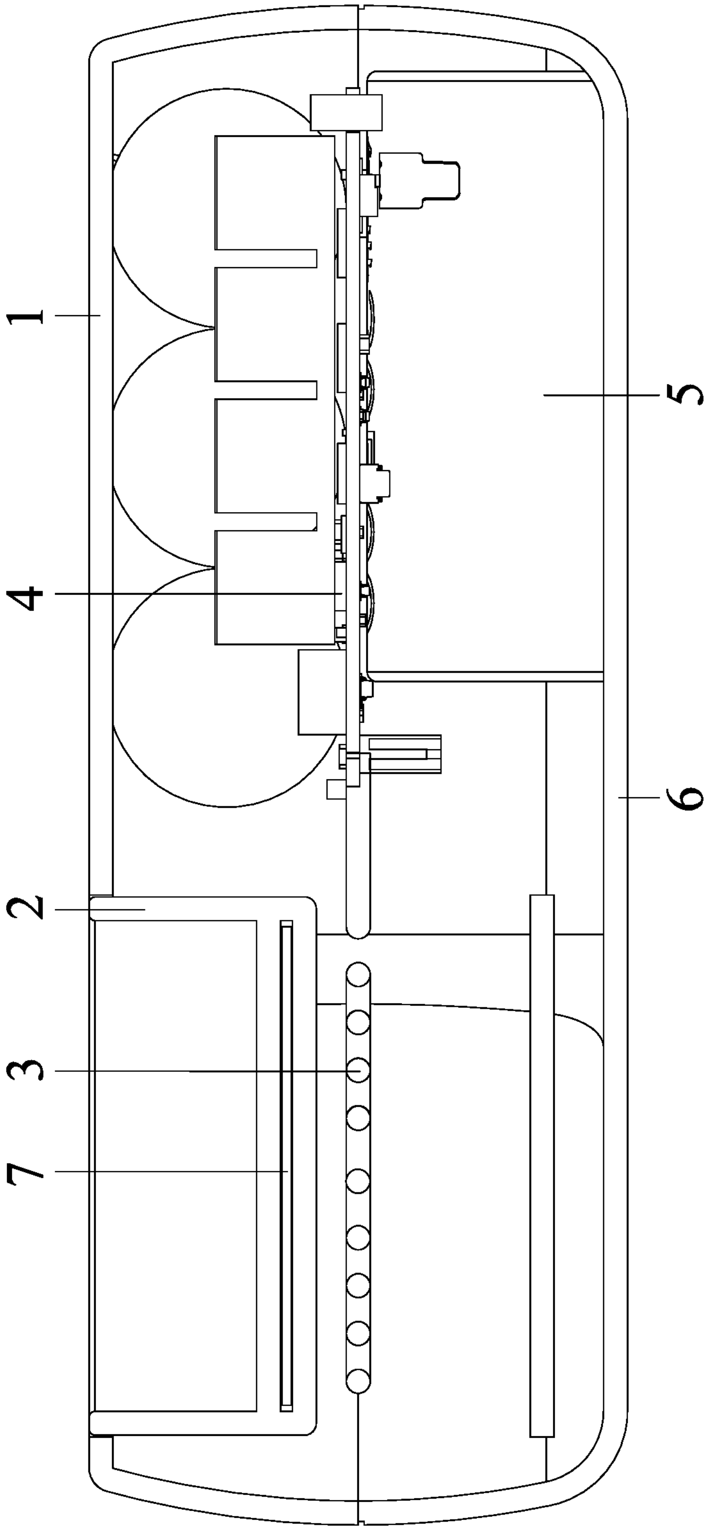
FIG. 3 is a sectional view of a high-frequency heating device in accordance with one embodiment of the disclosure.

As shown in FIGS. 1-3, the disclosure provides an upper cover 1, a heating cup 2, a magnetic induction coil 3, a high-frequency control panel 4, a battery 5, and a lower cover 6. The heating cup 2 comprises an insulating high temperature resistant glass with an inlaid metal 7, so that the metal 7 is in non-contact with the magnetic induction coil 3 thus preventing the electric leakage of the magnetic induction coil 3. The magnetic induction coil 3 is a flat spiral structure and is coated with an insulating high temperature resistant material. The heating cup 2 is configured to accommodate a tobacco material and is disposed on the magnetic induction coil 3. The heating cup 2, the magnetic induction coil 3, the high-frequency control panel 4, and the battery 5 are disposed in a space formed by the upper cover 1 and the lower cover 6. The upper cover 1 comprises an opening communicating with the heating cup 2 and the tobacco material is added to the heating cup via the opening. The upper cover 1 and the lower cover 6 are polymer materials with thermal insulation and electric insulation properties. The battery 5 is soldered on the input end of the high-frequency control panel 4. The output end of the high-frequency control panel 4 is soldered on the input end of the magnetic induction coil 3 to supply alternating voltage and alternating current for the magnetic induction coil 3 whereby an alternating magnetic field is formed in the magnetic induction coil 3. Thus, an eddy current is produced in the heating cup 2 placed in the alternating magnetic field and heat is produced. In this way, the tobacco material in the heating cup is heated.

In certain embodiments, the heating cup 2 is made of metal or non-metallic graphite with good conductivity, or quartz, crystal, mica and jade with an inlaid metal or non-metallic graphite. The magnetic induction coil 3 is a flat structure of a triangle, quadrilateral, or polygon. The magnetic induction coil 3 optionally comprises a through hole and the heating cup 2 is disposed in the through hole. The upper cover 1 and the lower cover 6 are nonmetal materials with thermal insulation and electric insulation properties.

The high-frequency heating device of the disclosure is used in an electronic cigarette, or used in an electronic hookah where the smoke or vapor is filtered in water.

The following advantages are associated with the high-frequency heating device of the disclosure:

1. The tobacco material is heated through magnetic induction.

2. The metal is inlaid in the heating cup, and thus the produced smoke or vapor does not contact the metal, which is healthy for user's inhaling.
3. The magnetic induction coil is a flat spiral disc. The design is novel.

It will be obvious to those skilled in the art that changes and modifications may be made, and therefore, the aim in the appended claims is to cover all such changes and modifications.

What is claimed is:

1. A high-frequency heating device, comprising a heating cup and a magnetic induction coil, wherein the magnetic induction coil is a flat spiral;

the heating cup is disposed on the magnetic induction coil;

the heating cup comprises a cup base and a cup space for holding tobacco material;

the cup base comprises glass and metal; and the metal is enclosed within the glass and is separated from the cup space.

2. The device of claim 1, wherein the magnetic induction coil is a coiled copper wire coated with an insulating high temperature resistant material.

3. The device of claim 2, further comprising an upper cover and a lower cover; wherein the heating cup and the magnetic induction coil are disposed in a space formed by the upper cover and the lower cover.

4. The device of claim 3, wherein the upper cover comprises an opening communicating with the heating cup and a tobacco material is added to the heating cup via the opening.

5. The device of claim 4, further comprising a high-frequency control panel and a battery disposed in the space formed by the upper cover and the lower cover, wherein the battery is soldered on an input end of the high-frequency control panel; an output end of the high-frequency control panel is soldered on an input end of the magnetic induction coil to supply alternating voltage and alternating current for the magnetic induction coil whereby an alternating magnetic field is formed in the magnetic induction coil.

6. An electronic cigarette, comprising the high-frequency heating device of claim 1.

7. The electronic cigarette of claim 6, further comprising a smoke filter configured to filter smoke or vapor in water for user's inhaling.

* * * * *